US009357714B2

(12) United States Patent
Van Der Knaap et al.

(10) Patent No.: US 9,357,714 B2
(45) Date of Patent: Jun. 7, 2016

(54) METHOD FOR CULTIVATING PLANTS AS WELL AS A FLOATING CARRIER

(75) Inventors: Maurice Cornelis Antonius Van Der Knaap, The Hague (NL); Christiaan Silvester Noordam, Schipluiden (NL)

(73) Assignee: CULTIVATION SYSTEMS B.V., The Hague (NL)

( * ) Notice: Subject to any disclaimer, the term of this patent is extended or adjusted under 35 U.S.C. 154(b) by 228 days.

(21) Appl. No.: 13/201,302

(22) PCT Filed: Feb. 15, 2010

(86) PCT No.: PCT/NL2010/050072
§ 371 (c)(1),
(2), (4) Date: Sep. 27, 2011

(87) PCT Pub. No.: WO2010/093248
PCT Pub. Date: Aug. 19, 2010

(65) Prior Publication Data
US 2012/0055086 A1 Mar. 8, 2012

(30) Foreign Application Priority Data
Feb. 13, 2009 (NL) ...................................... 2002527

(51) Int. Cl.
*A01G 31/00* (2006.01)
*A01G 9/00* (2006.01)
*A01G 31/02* (2006.01)

(52) U.S. Cl.
CPC . *A01G 9/00* (2013.01); *A01G 31/02* (2013.01)

(58) Field of Classification Search
CPC ....... A01G 31/02; A01G 27/00; A01G 1/001; A01G 9/02

USPC ................................ 47/59 R, 62 R, 65.9, 65.5
See application file for complete search history.

(56) References Cited

U.S. PATENT DOCUMENTS

| 4,118,892 | A | * | 10/1978 | Nakamura et al. | 47/65.9 |
| 4,133,141 | A | * | 1/1979 | Lee | 47/79 |
| 4,329,812 | A | | 5/1982 | Carlisle | |
| 4,487,588 | A | * | 12/1984 | Lewis et al. | 441/43 |
| 4,495,725 | A | * | 1/1985 | Talbott | 47/85 |

(Continued)

FOREIGN PATENT DOCUMENTS

| EP | 0 052 264 | 5/1982 |
| EP | 0 804 873 | 11/1997 |

OTHER PUBLICATIONS

International Search Report dated May 31, 2010, corresponding to the PCT application.

*Primary Examiner* — Joshua Huson
(74) *Attorney, Agent, or Firm* — Young & Thompson

(57) ABSTRACT

Method for the floating cultivation of a plant, in which, in a first stage of growth, the roots of the plant are kept at a distance from a water supply situated underneath the plant. The supply of moisture to the plant can be effected via the intermediate space between the float for the plant and the water supply and from the top side of the plant. As the plant develops further, the root system grows in the direction of the water supply and, in a second stage of growth, the vast majority of the water requirement is satisfied directly by the water supply. This is achieved by way of a panel which floats on the water supply and is provided with holes for accommodating the plant. This panel may be provided with recesses which are closed at their top sides and reduce the area of contact with the water and provide closed chambers.

20 Claims, 4 Drawing Sheets

(56) References Cited

U.S. PATENT DOCUMENTS

| | | | |
|---|---|---|---|
| 4,513,533 A * | 4/1985 | Gething et al. | 47/63 |
| 4,531,324 A * | 7/1985 | Yang et al. | 47/81 |
| 4,622,775 A | 11/1986 | Glenn et al. | |
| 4,669,217 A * | 6/1987 | Fraze | 47/64 |
| 4,769,946 A * | 9/1988 | de Groot et al. | 47/73 |
| 4,888,912 A * | 12/1989 | Murray | 47/1.4 |
| 4,982,527 A * | 1/1991 | Sprung | 47/59 R |
| 5,172,516 A * | 12/1992 | Maillefer | 47/80 |
| 5,261,185 A * | 11/1993 | Koide et al. | 47/63 |
| 5,324,657 A * | 6/1994 | Tanny | 435/420 |
| 5,435,098 A | 7/1995 | Koide et al. | |
| RE35,006 E * | 8/1995 | Ripley et al. | 47/65.9 |
| 5,657,577 A * | 8/1997 | Rodder | 47/64 |
| 5,799,440 A * | 9/1998 | Ishikawa et al. | 47/65 |
| 5,855,091 A * | 1/1999 | Santoiemmo | 47/59 R |
| 6,134,834 A * | 10/2000 | Ripley et al. | 47/86 |
| 6,678,997 B1 * | 1/2004 | Howe | 47/65.5 |
| D571,024 S * | 6/2008 | Lee | D25/199 |
| 7,716,873 B2 * | 5/2010 | Irwin | 47/65.9 |
| 7,845,114 B2 * | 12/2010 | Kirtz et al. | 47/87 |
| 8,122,682 B2 * | 2/2012 | Mischo | 52/747.1 |
| 2004/0255513 A1 | 12/2004 | Becker | |
| 2007/0137100 A1 * | 6/2007 | Beeman et al. | 47/59 R |
| 2008/0302006 A1 * | 12/2008 | Hurkx et al. | 47/61 |

* cited by examiner

METHOD FOR CULTIVATING PLANTS AS WELL AS A FLOATING CARRIER

The present invention relates to a method for cultivating a plant, comprising providing a carrier for said plant and providing a water supply.

EP 0804873 discloses a method in which the water supply is provided in a container having a top edge, in which the plant is placed in a lid which is arranged on such top edge and there is a distance between the bottom side of the plant container and the water surface.

U.S. Pat. No. 4,622,775 describes a floating carrier provided with a number of apertures in which plants in containers are provided. The water level is higher than the bottom of the containers. U.S. Pat. No. 5,435,098 also describes a number of floating carriers, each of which has apertures for one or more plants.

The plant can develop and may optionally be provided with a small amount of substrate. During harvesting, very little substrate waste, if any, is produced, while, in addition, the conditions during plant development can be optimized.

It is an object of the present invention to optimize the prior-art method by lowering the costs, reducing the susceptibility to failure and preventing the development of diseases, rot and the like as far as possible.

This object is achieved in the method described above with the features of claim 1.

According to the present invention, during the second stage of growth of the plant, which usually follows a few days after the first stage of growth, the moisture is drawn mainly from the water supply due to the fact that the roots have reached the water supply. As a result, it is no longer necessary to supply additional moisture to the intermediate space between the top side of the water supply and the bottom side of the carrier. In addition, it is not necessary to provide moisture to the leave side of the plant, that is to say to the upper side of the plant. More particularly, during the second stage of growth, no moisture is supplied to the plant in the form of vapour or by sprinkling or the like of the roots in the intermediate space. During the first stage, it is however possible to provide moisture to the plant and more particularly to the root system via the intermediate space. According to the present invention, this is preferably carried out solely in the form of vapour in order to prevent the long-lasting formation of droplets on the root system as much as possible. During the first phase, the plant may be sprinkled from above.

According to the present invention, cultivation is carried floating. This means that the carrier together with the plant situated thereon/therein is solely supported by the water. As a result of the floating arrangement, it is possible to adjust the distance between the bottom side of the root and the water surface accurately and in a simple manner, so that the growth process of the roots can be accurately controlled, that is to say from the first stage of growth where there is a critical distance between the root tip and the water surface to a further stage of growth where the roots are situated in the water. However, according to a particular embodiment of the invention, the area of contact between said carrier and the water is limited. The (panel-shaped) carrier according to the present invention has a top side or plant side and a bottom side or water side. According to the invention, only part of the bottom side is in contact with the water so that, during use, a much larger part of the water surface is not in contact with the carrier than is necessary for the growth of the root system. It will be understood that during the initial stages of development of a plant, no root may yet be visible, as is the case, for example, with a cutting, bulb or tuber. Obviously, this falls within the scope of the present invention.

Surprisingly, it has been found that by choosing the free surface area of the water, that is to say the surface area which is not in contact with the carrier, to be relatively large, the quality of the water improves significantly, as a result of which the plant develops in an optimum manner. By using a water supply, it is possible to facilitate transportation of the panel-shaped carrier, but it is obviously also possible to (partially) take the panel-shaped carriers out of the water in order to transport them. By using a water supply, the temperature to which the roots are exposed can be adjusted very accurately and it is likewise possible to meter the amounts of fertilizer and other substances in a very accurate and optimum manner by adjusting the composition of the water.

According to a further advantageous embodiment of the invention, the plant is suspended in the air, situated at a distance from the water supply and the roots in the intermediate space are exposed to a degree of moisture of less than 99%, that is to say, that no sprinkling or the like takes place.

According to a further embodiment of the invention, the intermediate space is not ventilated. More particularly, no ventilation is carried out in the intermediate space during the first stage of growth. According to a further particular embodiment of the invention, specific measures are taken to maintain a high atmospheric humidity around the actual root. This can be achieved by providing a protection which seals off the intermediate space around the carrier, that is to say at the location of the hole for the plant. Such a preferably annular protection encloses the root system of the respective plant or the respective plants.

The height of the intermediate space between the top of the water level and the bottom of the carrier preferably at least corresponds to the length of the actual root defined above. In practice, at the end of the first stage of growth, this length is between 1 and 5 cm, that is to say, in the first stage of growth, the distance between the free bottom end of the root and the water surface is between 1 and 5 cm.

The carrier is preferably arranged in a basin which has dimensions of at least 2×10 m. Compared to gutters, this makes it possible to control the water temperature more accurately. The basin has a depth of for example several tens of centimeters and as a result of the volume thereof, temperature fluctuations can be kept to a minimum. If the basin is arranged on the ground, the temperature can be stabilized further as a result of heat emission/absorption by the ground. Preferably, a number of carriers is provided in a basin, so that the basin is substantially completely filled with carriers. A carrier preferably has a number of apertures for accommodating plants, for example 10-500 apertures.

The present invention also relates to a panel-shaped carrier or float for the floating cultivation of plants or its precursors comprising one or more continuous holes for accommodating plants, in which, inside the periphery of said panel, at least 20% and more particularly at least 50% of the surface area of the bottom side of said panel is not in contact with the water when it is floating on the water. According to the present invention, a large part of the surface area which, in projection, is situated below the panel or float, is not in contact with the water. Since a large part of the water surface on which the float floats is free, it is possible to take up air. This can be achieved in various ways, optionally in combination. According to a first embodiment, the panel or float consists of a material having a particularly high buoyancy. According to a particular embodiment of the present invention, the surface area of the panel-shaped carrier which is not in contact with the water on the water side is at least 50% greater than the (total) surface area of the apertures on the top side, that is to say the plant side of the carrier. This increased surface area can be achieved by increasing the cross-sectional dimensions of the apertures in the direction towards the water. According to yet a further embodiment of the invention, part of the buoyancy of the panel or float is achieved by chambers which are optionally gas-tight. Thus, the area of contact with the water can be made smaller and the amount of material used for the panel or float can be reduced. These chambers or recesses have to be distinguished from the apertures which contain plants and which usually extend through the panel or float. The latter accommodations or apertures are specifically embodied to receive one or more plants and do not contribute to the buoyancy, but air which is taken up by the water can be supplied through them. According to a further variant, it is possible to make the accommodation or apertures for the plants, in particular at the bottom side of the panel-shaped carrier, that is to say that part which faces towards the water, larger than on the top side. This is another way of increasing the free surface area of water, that is to say the water surface which is not in contact with the carrier, and this makes it possible to improve the water quality. In addition, this variant offers the possibility of producing an interaction between the water surface and the environment by gas leaking through the aperture which contains the plant. On the other hand, contrary to the above-described embodiment with gas-tight chambers, such parts of the panel which are widened at the bottom side of the aperture do not contribute to the buoyancy, due to the fact that the gas is leaking out.

The total surface area of the recesses or chambers and any holes for plants is at least 20%, and more particularly at least 50%, of the surface area which can be delimited by the periphery of the panel. This results in the creation of a large free surface area of water which interacts with the air.

According to a further embodiment of the invention, the top side of the panel or float is embodied in such a manner that water drains away, so that no water remains behind.

The crop can be accommodated in the apertures in the float or panel in any conceivable way. A first possibility is to place a plant in the respective aperture without a container and without substrate. A further possibility is to introduce a substrate which contains the plant into the aperture, in which case the roots can be situated in the substrate or extend beyond the latter. The substrate may, with or without the container, be accommodated in the aperture in the float or panel. A further possibility is to place the plant in a container which may optionally be provided with substrate and to arrange such a container in the float.

In all cases, it is advantageous if the float or panel and the container are embodied such that a developing plant which protrudes laterally and hangs down cannot rest on the surface of the panel adjacent to the aperture since this could result in rotting, damage and other undesirable effects. To this end, either the aperture or the container is embodied in such a manner that a peripheral edge is present which forces the plant away from the surface of the panel or float directly adjacent to the aperture.

The term root system is understood to mean that part of the plant which can produce root cells. It comprises a root neck and the actual roots which are situated below the latter. The root neck is the transition between the central stem and the actual roots. In general, this is an extension of the central stem of the plant.

When a plant develops well, it is possible to transfer the plant during the growing stage. This means that two (or more) types of panel-shaped carriers are used to receive the plants.

It is then possible to grow the plant in a pot and to use the same pot when creating more space between the plants, that is to say when they being are placed in another panel-shaped carrier. The respective carriers can be adapted to the different growing conditions. This relates inter alia to the different (mean) weight, the size of the plants and, if appropriate, to the desired distance of the bottom side of the pot or root ball from the water supply. It is also possible to use only some of the apertures from a previously used panel at a later stage of growth, that is to say to remove some of the plants in order to create more space for the other plants.

When more space is created between plants in this way, the number of plants per unit area will be significantly reduced, for example by at least 50%.

Therefore, the present invention relates to an assembly comprising two panel-shaped carriers having a buoyancy as described above, in which the number of apertures per unit area of the first carrier is at least twice as large as that of the second carrier. The invention also relates to a method for cultivating a large number of plants as described above, in which the plants are situated at a first distance from one another in the first carrier during cultivation and are then transferred to a second carrier at a second distance from one another which is at least twice as large as the first distance. The invention also relates to a system comprising a basin filled with water, a carrier arranged in said basin and floating on said water, which carrier comprises a number of continuous holes, in which a plant with roots is placed, said plant being arranged in said apertures in such a manner that the bottom end of said roots is situated at a distance from the surface of the water near said hole.

The present invention is used in particular for cultivating lettuce, but can also be used for other plants.

In order to make the above-described procedure of creating more space between plants possible, the plant is preferably placed in a plant container which can be fitted in the respective aperture of the carrier or panel. The aperture in the carrier or panel is larger than the aperture provided in the container for the plant and it is readily possible to remove the plant with the root through the aperture in the carrier.

In addition, it is possible to place the plant into the plant container, for example as a plug or the like, and to embody the plant container in such a manner that such a plug can readily be removed therefrom, that is to say with any roots which may or may not be present.

In addition, it is possible to embody such a plant container in two parts, with one part which can be manufactured particularly easily being situated at the location of the transition from the plant to the root. This part functions as support for the plant.

The invention will be described in more detail below with reference to an exemplary embodiment illustrated in the drawing, in which:

FIG. 1 diagrammatically shows a perspective view of a cultivation space provided with a number of floats or panels according to the invention;

Figure 4:
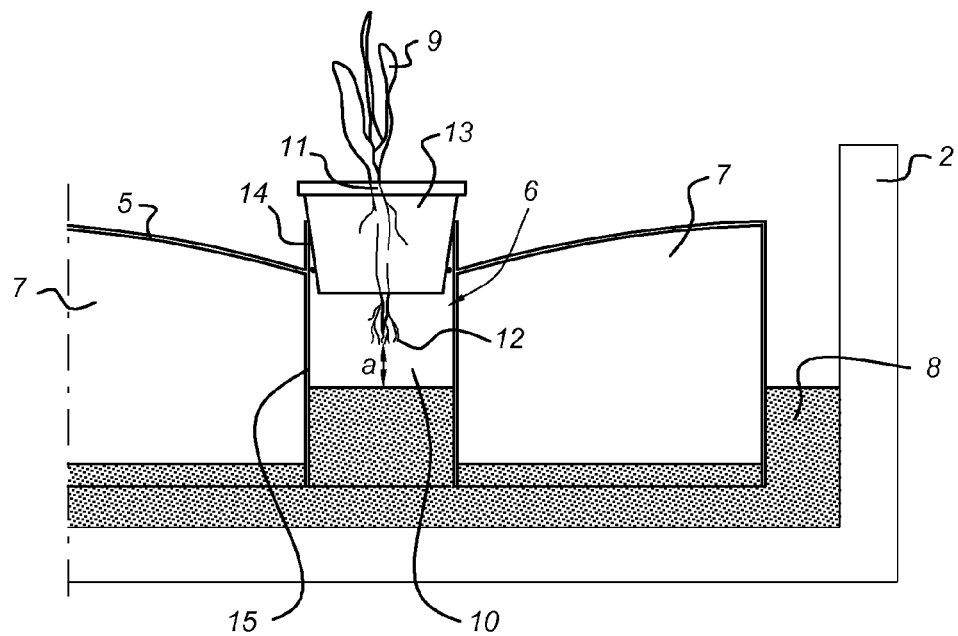
Figure 5:
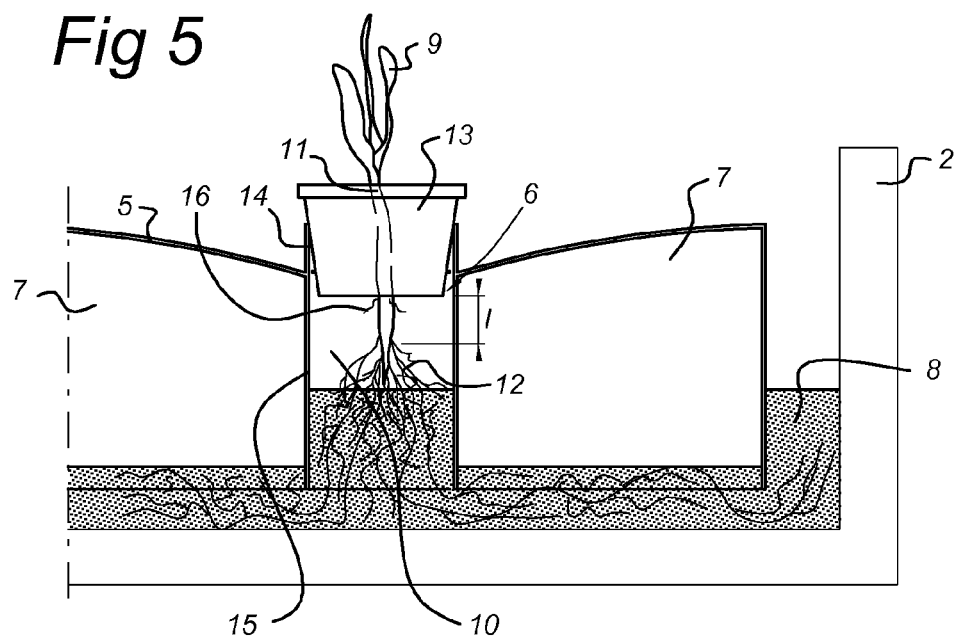
Figure 6:
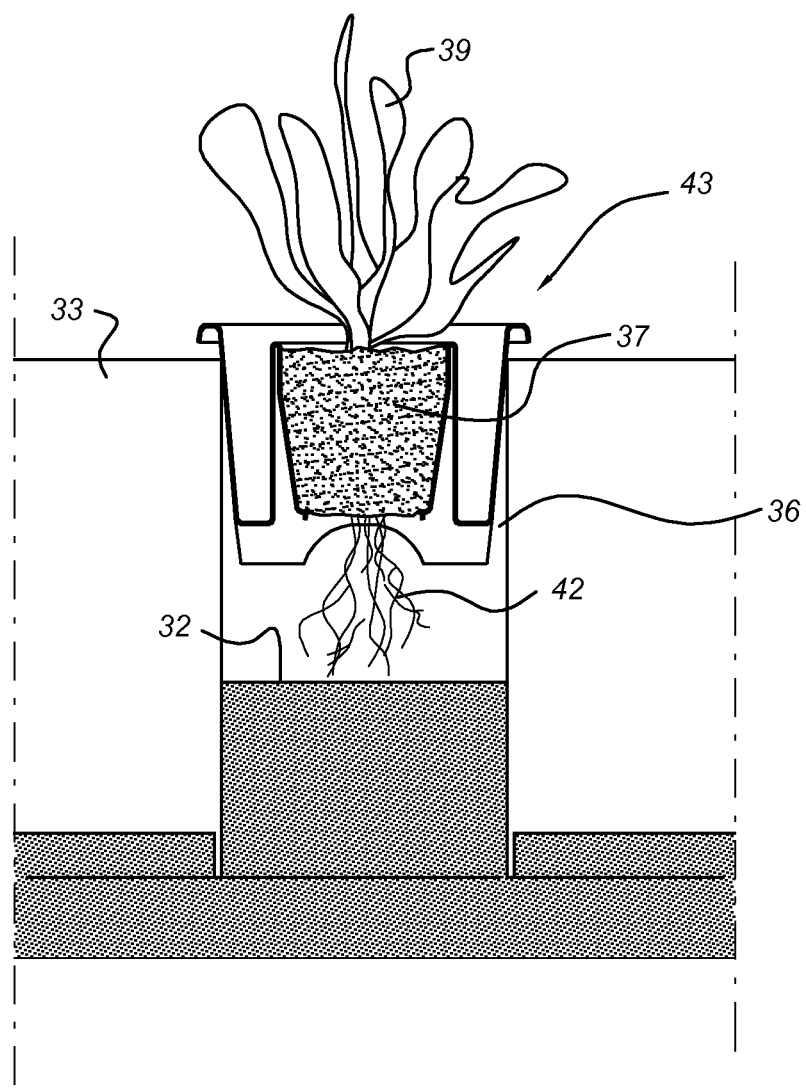

FIG. 4 diagrammatically shows a detail of the panel in cross section with a developing plant in a first stage of growth;

FIG. 5 shows the detail from FIG. 4 in a second stage of growth of the plant; and FIG. 6 shows a cross section of a further embodiment of the plant container with carrier.

Figure 1:
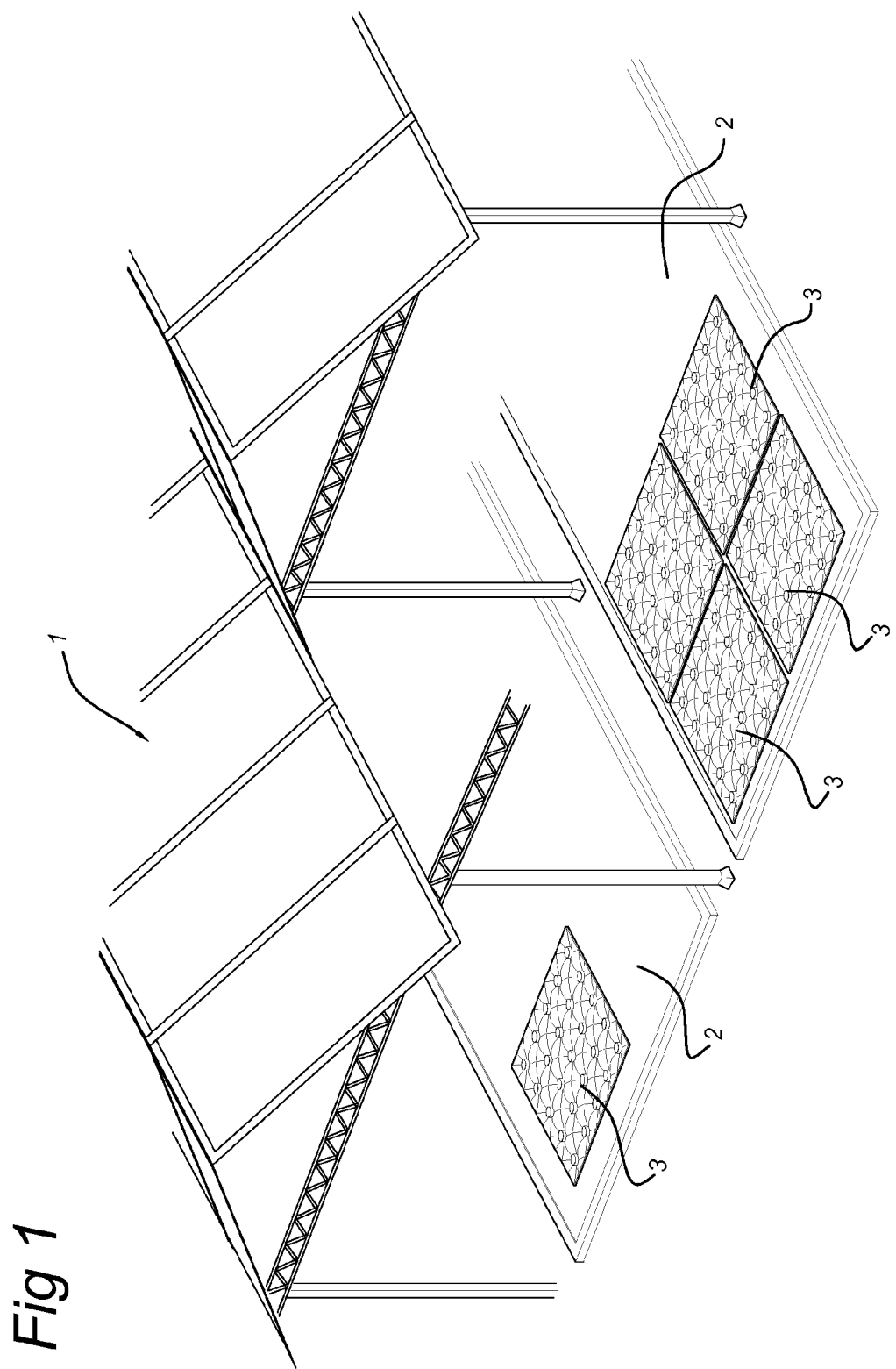

In FIG. 1, reference numeral 1 denotes a cultivation space which accommodates the floats or plates 3 according to the present invention in a water-filled basin 2. The cultivation space is shown here as a greenhouse, but it should be understood that any kind of cultivation space can be used, optionally provided with natural and artificial lighting. It is likewise possible to place the basin 2 with floats 3 in the open air. Basin 2 is filled with water on which the floats 3 float. The water level is indicated in FIG. 4 by reference numeral 8. By means of such a structure, the climate for the plant can be optimized and it is also possible to simplify the logistics in a cultivation space. One or more floats or panels can be moved in a basin and, for example, moved to a processing space or to another basin, depending on the development of the crop and/or on whether certain parts thereof have already been harvested.

Figure 2:
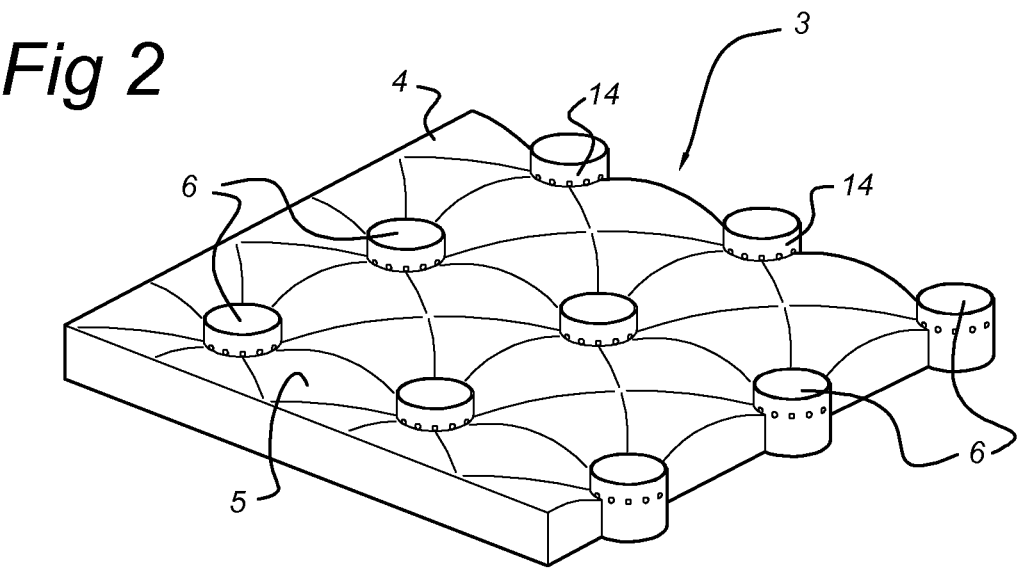
FIG. 2 shows the top side of a panel in perspective.
Figure 3:
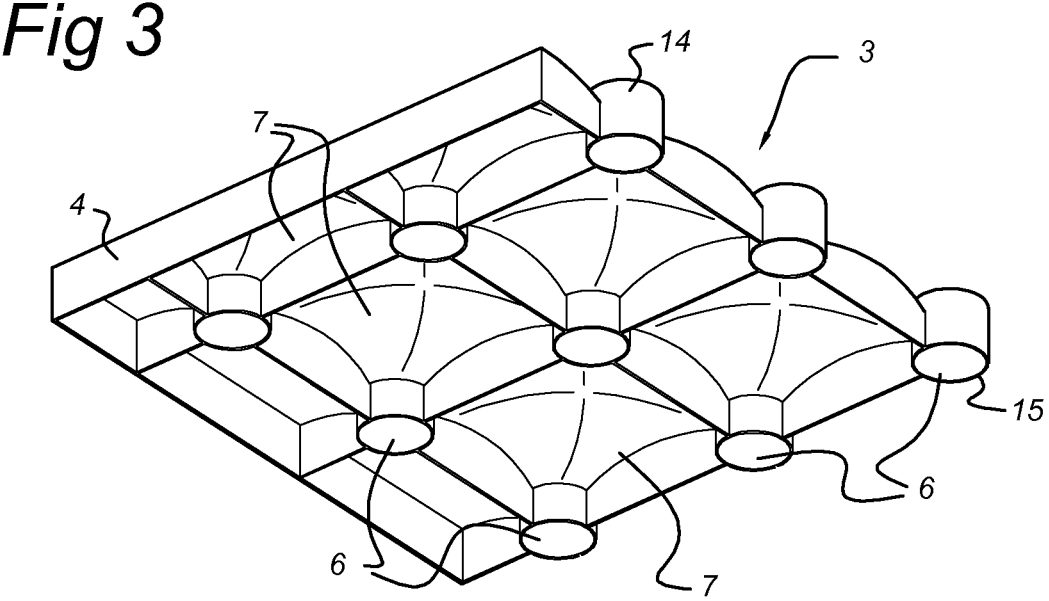
FIG. 3 shows the bottom side of the panel shown in FIG. 2.

FIG. 2 shows a detail of a float or panel 3. This consists of a body material which, in the present exemplary embodiment, is preferably a foam material made from hard plastic, such as for example a polystyrene material. However, it is also possible to produce it from another material or combination of different parts. As can be seen in FIG. 2, the top surface, which is denoted by reference numeral 5, is of a design which is curved in such a manner that water which is present thereon flows away into the basin. Thus, no water will remain on the upper surface 5 of the float or panel. Continuous apertures or holes 6 are provided in the float or panel. FIGS. 2 and 4, 5 show that these are provided with a vertical edge 14 which is raised with respect to the direct surroundings of the upper surface 5 of the panel. FIG. 3 shows details of the bottom side of the panel and it can be seen that it is provided with a number of chambers 7 which are gas-tight towards the top and open towards the bottom.

In FIGS. 4 and 5, it can be seen that, on the one hand due to the buoyancy of the body 4 and, on the other hand, due to the volume of gas caught in the chambers 7, the panel or float 3 floats on the water 8. Due to the latter fact, fewer or no requirements are imposed on the buoyancy of the material of the body 4 (see FIGS. 2 and 3). The length of the holes 6 is such that, on the bottom side, they extend up to and preferably into the water. Thus, a number of protected spaces are created for the plant which is denoted by reference numeral 9 in FIGS. 4 and 5. In this example, this plant is accommodated in a container 13 and the root system thereof consists of a root neck 11 and the actual roots 12 originating therefrom. These are situated inside the tubular space 10 of hole 6. Inside this space, which is delimited by tube 15, a microclimate exists which has a positive effect on the development of the root system. During the first stage of growth illustrated in FIG. 4, the root system is at a distance a from the water surface 8. Surprisingly, it has been found that, due to this microclimate, the plant develops downwards. It is assumed that as a result of the relatively low moisture content in the space between the water level 8 and the bottom side of the carrier, that is to say intermediate space 10, compared to the known systems, the roots strive to reach the water level 8 as quickly as possible. The rights sought in the claims do not depend on the validity of this theory. In any case, it has been found that the roots develop particularly quickly in the downward direction, starting from the root neck 11. This development is illustrated in FIG. 5 and shows the results which are achieved after only a few days. The length of the actual root which is situated in the air, that is to say the intermediate space, is denoted by reference 1 and is smaller than the height of the intermediate space, that is to say there is no contact with the water. This length varies depending on the way in which growing takes place. In the present example, a substrate is used and the length is defined as the part which is below the substrate. If no substrate is used, the length is that part which extends directly below the root neck itself. This part can grow in a few days.

It has been found that the space in which the root system develops has an optimum climate which is particularly rich in oxygen.

The present invention provides a combination of preferably aeroponic and hydroponic cultivation. That is to say that during the first stage of growth, the largest part of the water requirement of the developing plant is supplied by the environment, that is to say the air or the substrate. Only during the second stage of growth is the largest part of the of the water requirement satisfied by the water supply.

The water supply will preferably be kept in motion in order to prevent the development of unwanted diseases and the like. In addition, fertilizers can be supplied continuously, depending on the development of the plant. In the space which is situated below the root neck and above the water level, (air) roots 16 may be formed.

FIG. 6 diagrammatically shows a part of an alternative embodiment of a carrier denoted by reference numeral 33. This is rectangular and has, for example, dimensions of 20×150 cm. A large number of apertures or holes 36 are provided therein, which are preferably designed so as to conically taper slightly towards the water surface 32.

The plant container is denoted overall by reference numeral 43, with the actual plant 39 being situated in a ball of substrate 37 from which roots 42 extend. The aperture in the plant container 43 for the ball of substrate 37 is much smaller than the size of the hole 36. As a result, it is possible to remove the plant together with the plant container 43 from the aperture 36 even if the roots 42 extend laterally. In this manner, the plant can be transferred to another float or carrier 33 during its growing stage in order to create space between the plants.

Instead of the plant container shown here, or in combination therewith, the plant 39 may be attached to a single disc-shaped plastic part which can be moved with the plant and is intended for single use.

It will be clear that where the term plant is used in the above description, this is also understood to include seeds, cuttings and the like. This means that the above-described plant may be grown from a seed.

Using the method according to the invention, it is also possible to cultivate numerous kinds of plants. Lettuce and chrysanthemums are mentioned by way of example.

After reading the above, those skilled in the art will immediately be able to think of variants which are obvious and fall within the scope of the attached claims. Reference is made in particular to the above-described variant in which, starting from FIG. 2 et seq., the tube 15 may be perforated or may be completely absent. It is also possible for the tube 15 to be given a significantly larger cross-sectional area towards the bottom, that is to say in the direction of the water supply. This tapering may be of a conical, step-like or in any other conceivable design. The panel according to the present invention is preferably embodied to accommodate a large number of plants, such as for example at least 500 plants per panel-shaped carrier.

The invention claimed is:

1. A method for the floating cultivation of a number of plants, comprising:
   providing a carrier with apertures for said plants and gas chambers, wherein said carrier comprises a body having an upper and lower surfaces surrounding the apertures and a downwardly extending outer edge located at a peripheral edge of the carrier, and the apertures are each vertically continuous apertures defined by an upwardly extending edge that is raised with respect to the surrounding upper surface and a downwardly extending tube that extends down from below the lower surrounding surface, and wherein the gas chambers are defined by a plurality of interior walls that extend downwardly from the lower surface of the body wherein each interior wall extends between adjacent downwardly extending tubes or between a downwardly extending tube and the downwardly extending outer edge of the periphery; and providing a water supply, wherein said carrier is provided on said water supply in a floating manner to define a floating arrangement supported by the water of the water supply, wherein roots of said plant or the precursor thereof with a small amount of substrate are placed in an air-containing intermediate space in the downwardly extending tubes of the apertures in said carrier at such a distance from said water supply that said roots of said plant or the precursor thereof are situated at a vertical distance from said water supply, wherein the intermediate space is configured to have a climate rich in oxygen such that air roots are formed in the air-containing intermediate space, in a first stage of growth of said plant or the precursor thereof, controlling a growth process of the root by adjusting a buoyancy of the floating arrangement to adjust a height of a column of water present in each aperture to thereby control a distance between a root tip at a free bottom end of the roots and a surface of the water so that at least a significant part of the requirement for moisture of said plant or the precursor thereof is satisfied by said intermediate space between said carrier and said water, wherein the height of said intermediate space corresponds at least with a length of the root of said plant at the end of said first stage of growth, where at the end of the first stage of growth, the length of the root of said plant is between 1 and 5 cm and, and during the first stage of growth, a vertical distance between the free bottom end of the root and the water surface is between is 1 and 5 cm, wherein, in a second, further stage of growth of said plant, at least 90% of the moisture requirement of said plant is satisfied directly by said water supply, wherein said first stage of growth comprises at least a few days.

2. The method according to claim 1, wherein during said second stage of growth, substantially no moisture is added to said intermediate space or to said carrier.

3. The method according to claim 1, wherein said carrier with said plants is embodied such that, of the surface of said carrier measured along the outer periphery thereof, at most 50% on the water side is in contact with said water supply.

4. The method according to claim 1, wherein, during said first stage of growth in said intermediate space, the gas which is situated therein is stationary.

5. The method according to claim 4, wherein a protection which seals the intermediate space is provided around said carrier.

6. The method according to claim 1, wherein a series of plants are arranged next to one another in a carrier and in which the distance between said plants is increased during the second stage of growth.

7. The method of claim 1, wherein, the the upper surface of the carrier is curved, to direct a flow of water away from the upper surface, the interior walls extend horizontally between adjacent ones of the downwardly extending tubes such that the gas chambers are gas-tight chambers, and the downwardly extending outer edge, the interior walls, and the downwardly extending tubes have lower edges that are level relative to each other to assist and control buoyancy and water level within the column, further comprising:

locating the plant or the precursor within a plant container with the plant container resting on a top perimeter of the upwardly extending edge, each said apertures having sharing a portion of the wall of the surrounding chambers defining a tubular protected space with a microclimate, each said apertures being open towards the bottom of the carrier and being filled with the water, the tubular protected space including the intermediate space, the microclimate being the climate rich in oxygen, and a water level within each said aperture is higher than a corresponding water level of the surrounding chambers.

8. The method of claim 7, wherein, the microclimate comprises a low moisture content in the space between the water level within each said apertures and a bottom side of the plant container.

9. The method according to claim 1, wherein the composition of the water can be adjusted to meter the amount of nutrients present therein, and wherein the plant mainly absorbs nutrients from the water supply on which the plant floats, nutrient concentrations in the water supply being monitored and adapted to requirements of the plant accordingly.

10. A system, comprising:

a basin filled with water, a carrier provided in said basin and floating on said water, said carrier provided with holes for holding plants and gas chambers, wherein said carrier comprises a body having an upper surface and a lower surface surrounding the holes and a downwardly extending outer edge located at an outer periphery of the body, and the holes are each vertically continuous holes defined by an upwardly extending edge that is raised with respect to the surrounding upper surface and a downwardly extending tube that extends below the surrounding lower surface, and wherein the gas chambers are defined by a plurality of interior walls that extend downwardly from the lower surface of the body wherein the interior walls extend between adjacent downwardly extending tubes or between a downwardly extending tub and the downward extending outer edge at the periphery of the body, wherein said holes are configured to accept a plant with roots or a precursor thereof with a small amount of substrate, said plant being arranged in such a manner in said holes that the bottom end of said plant is situated at a distance from a surface of said water near said hole so that the roots are placed in an air-containing intermediate space in the downwardly extending tubes of the holes in said carrier at such a distance from said water that said roots of said plant or the precursor thereof are situated at a vertical distance from said water, the intermediate space configured, a buoyancy of the carrier being adjustable to adjust a height of a column of water present each hole to thereby control a distance between a root tip at a free bottom end of the root and the surface of the water to control a growth process of the root to have a climate rich in oxygen such that air roots are formed in the air-containing intermediate space such that a length of the air roots of said plant may grow to between 1 and 5 cm, and when said air roots are growing to the length between 1 and 5 cm, a vertical distance between a free bottom end of the air roots and the water is between is 1 and 5 cm.

11. The system of claim 10, wherein,
the gas chambers are gas-tight towards the upper surface and open towards a bottom of the carrier so as to allow the gas chambers to be filled with the water,
said holes open to the upper surface of said carrier, with the gas-tight chambers surrounding the holes,
the plant or the precursor is located within a plant container, the plant container resting on a top perimeter of the upwardly extending edge,
each said hole having sharing a portion of the wall of the surrounding chambers defining a tubular protected space with a microclimate, each said hole being open towards the bottom of the carrier and being filled with the water, the tubular protected space including the intermediate space, the microclimate being the climate rich in oxygen, and
a water level within each said hole is higher than a corresponding water level of the surrounding chambers.

12. The system of claim 11, wherein,
the microclimate comprises a low moisture content in the space between the water level within each said hole and a bottom side of the plant container.

13. The system of claim 10,
wherein the composition of the water can be adjusted to meter the amount of nutrients present therein to provide for monitoring nutrient concentrations in the water supply and adapting the amount of nutrients present therein to requirements of the plant accordingly, and
wherein the plant mainly absorbs nutrients from the water supply on which the plant floats.

14. The system of claim 10, wherein,
the the upper surface of the carrier is curved to direct a flow of water away from the upper surface,
the interior walls extend horizontally between adjacent ones of the downwardly extending tubes, and
the downwardly extending outer edge, the interior walls, and the downwardly extending tubes each have lower edges that are level relative to each other to assist and control buoyancy and water level within the column.

15. A panel-shaped carrier having buoyancy for floating cultivation of a number of plants or plant precursors, said carrier comprising:
   i) a body having an upper and a lower surface surrounding plural continuous holes, each hole for accommodating plants,
   ii) a downwardly extending outer edge located at an outer periphery of the body, and
   iii) gas chambers adjacent the holes, wherein,
the holes are each vertically continuous holes defined by an upwardly extending edge that is raised with respect to the surrounding upper surface and a downwardly extending tube that extends below the surrounding lower surface, and
wherein the gas chambers are each defined by a plurality of interior walls that extend downwardly from the lower surface of the body wherein the interior walls extend between adjacent downwardly extending tubes or between a downwardly extending tub and the downward extending outer edge at the periphery of the body,
the carrier with plants placed in the holes defining a floating arrangement that floats on water, and
wherein inside the outer periphery of said carrier, when the plant to be cultivated is present, at least 50% of the surface area of the water side of said carrier in the floating-posit ion on the water, is not in contact with said water, each said plant being arranged in a corresponding one of said continuous holes and a buoyancy of the floating arrangement being-adjustable to adjust a height of a column of water present in each hole to thereby control a distance between a root tip at a free bottom end of the roots and a surface of the water to control a growth process of the root such that the free bottom end of each said plant is situated at a distance from the surface of said water near said corresponding hole thereby creating an intermediate space with a climate rich in oxygen such that air roots form in the intermediate space with a length of the air roots of said plant growing to between 1 and 5 cm, and when said air roots are growing to the length between 1 and 5 cm, a vertical distance between a free bottom end of the air roots and the water is between is 1 and 5 cm.

16. The carrier according to claim 15, wherein,
the the upper surface of the carrier is curved to direct a flow of water away from the upper surface,
the interior walls extend horizontally between adjacent ones of the downwardly extending tubes,
the downwardly extending outer edge, the interior walls, and the downwardly extending tubes have lower edges that are level relative to each other to assist and control buoyancy and water level within the column, and
in use, a surface area delimited by the upper surface of the carrier is larger than a surface area of said carrier which is actually in contact with the water.

17. The carrier according to claim 16, wherein each said continuous hole is embodied to receive only a single plant container.

18. The carrier according to claim 15, wherein the continuous holes each comprise an aperture embodied to receive a plant container.

19. The carrier according to claim 15, wherein,
the interior walls extend horizontally between adjacent ones of the downwardly extending tubes,
the the upper surface of the carrier is curved to direct a flow of water away from the upper surface and towards the holes, and
the downwardly extending outer edge, the interior walls, and the downwardly extending tubes each have lower edges that are level relative to each other to assist and control buoyancy and water level within the column.

20. The carrier according to claim 15, wherein the composition of the water can be adjusted to meter the amount of nutrients present therein, and wherein the plant mainly absorbs nutrients from the water supply on which the plant floats, nutrient concentrations in the water supply being monitored and adapted to requirements of the plant accordingly.

* * * * *